US012705221B1

(12) United States Patent
Garty et al.

(10) Patent No.: US 12,705,221 B1
(45) **Date of Patent: *Aug. 11, 2026**

(54) SYSTEMS AND METHODS FOR IMPROVED STRUCTURED DATA DUPLICATION IN A DATABASE

(71) Applicant: Veeva Systems Inc., Pleasanton, CA (US)

(72) Inventors: Drew Garty, Madison, WI (US); Raymond T. Letulle, Jr., Orinda, CA (US); Mark Johnson, Livermore, CA (US); Lindsay Chan, Seattle, WA (US)

(73) Assignee: Veeva Systems Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/970,688

(22) Filed: Dec. 5, 2024

(51) Int. Cl.

*G06F 16/21* (2019.01)
*G06F 16/22* (2019.01)
*G06F 16/23* (2019.01)

(52) U.S. Cl.

CPC ........ *G06F 16/217* (2019.01); *G06F 16/2282* (2019.01); *G06F 16/2358* (2019.01)

(58) Field of Classification Search

CPC .................................................... G06F 16/217
USPC ........................................................ 707/802
See application file for complete search history.

(56) References Cited

U.S. PATENT DOCUMENTS 11,409,764 B2 * 8/2022 Rehal ...................... G06F 16/27
11,461,294 B2 * 10/2022 Soza ..................... G06F 16/235
2021/0081838 A1 * 3/2021 Hernández Rincón ...................... G06F 16/215
2021/0232560 A1 * 7/2021 Mateti ..................... G06F 16/25
2024/0012912 A1 * 1/2024 Zhang ..................... H04L 41/16

* cited by examiner

*Primary Examiner* — Muluemebet Gurmu

(57) ABSTRACT

Systems and methods for duplicating data in a data management system. As data is being updated in the data management system, a copy of the updated data is being written to a table for collecting the data changes. The data changes are flattened by a flattener to generate one or more flat files. A packaging controller may package the one or more flat files and generate a data change file. A listing API may list the data change files that are available. The data change file may be accessed via a data access API.

22 Claims, 8 Drawing Sheets

SYSTEMS AND METHODS FOR IMPROVED STRUCTURED DATA DUPLICATION IN A DATABASE

TECHNICAL FIELD

The present disclosure relates generally to database management, and more particularly to improving duplication of structured data.

BACKGROUND

Users increasingly depend on database systems because of their ubiquitous and managed access from anywhere, at any time, from any device. However, due to the amount of data in use, uploading, downloading and synchronization to the database may present certain challenges. Incremental database solutions may speed up processing times, but also introduces additional problems such as: data inconsistency, difficulty handling updates and deletions accurately, complex logic for identifying changed records, potential for data loss if not properly tracked, challenges with processing order, and increased monitoring requirements to ensure data quality. There is a need for a system and method for improving duplication of data in database systems that provides the capability of increased efficiency handling large amounts of data without the aforementioned challenges mentioned above.

SUMMARY OF THE INVENTION

Embodiments disclosed in the present document provide machine-implemented method for improved data duplication from a data management system, wherein the data management system comprises at least one data repository and a data duplication controller. The computer-implemented method comprising: recording a first data change to a first object in the at least one data repository to a first delta table for collecting the data changes in the data management system, wherein the delta table comprises associated fields corresponding to the first object, and a delta indicator specifying whether the first data change is an addition, update, or deletion; recording a second data change to a second object in the at least one data repository to a second delta table for collecting the data changes in the data management system, wherein the delta table comprises associated fields corresponding to the second object, and a delta indicator specifying whether the second data change is an addition, update, or deletion; extracting the first data change by a data extractor in the data duplication controller; extracting the second data change by the data extractor in the data duplication controller; running a data flattener in the data duplication controller to generate flattened data for the extracted first and second data changes, and creating a first flat file for the flattened data for the first extracted data change and a second flat file for the flattened data for the second extracted data change, and wherein the first extract is configured to extract a first object in the data management system and the second extract is configured to extract a second object in the data management system; receiving the first and second flat files from the data flattener at a first predetermined time interval, and creating a first data change file to package the first flat file and the second flat file for the flattened data for the extracted data changes by a packaging controller in the data duplication controller; and presenting the first data change file with a listing API in the data duplication controller to enable access to the data change file.

BRIEF DESCRIPTION OF THE DRAWINGS

For a more complete understanding of the present application and its advantages, references are now made to the following description taken in conjunction with the accompanying drawings, in which like reference numbers indicate like features.

Although similar reference numbers may be used to refer to similar elements for convenience, it can be appreciated that each of the various example embodiments may be considered to be distinct variations.

The present embodiments will now be described hereinafter with reference to the accompanying drawings, which form a part hereof, and which illustrate example embodiments which may be practiced. As used in the disclosures and the appended claims, the terms "embodiment" and "example embodiment" do not necessarily refer to a single embodiment, although it may, and various example embodiments may be readily combined and interchanged, without departing from the scope or spirit of the present embodiments. Furthermore, the terminology as used herein is for the purpose of describing example embodiments only, and are not intended to be limitations. In this respect, as used herein, the term "in" may include "in" and "on," and the terms "a", "an", and "the" may include singular and plural references. Furthermore, as used herein, the term "by" may also mean "from," depending on the context. Furthermore, as used herein, the term "if" may also mean "when" or "upon," depending on the context. Furthermore, as used herein, the words "and/or" may refer to and encompass any and all possible combinations of one or more of the associated list items.

DETAILED DESCRIPTION OF INVENTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

Embodiments disclosed in the present invention allow for improved data duplication from a data management system. According to one aspect of the subject technology, data changes are written to a log table for collecting the data changes in the data management system. Data changes are extracted and transformed into a flattened data file. A data file may be generated for each object in the data management system and packaged into a data change file.

Figure 1A:
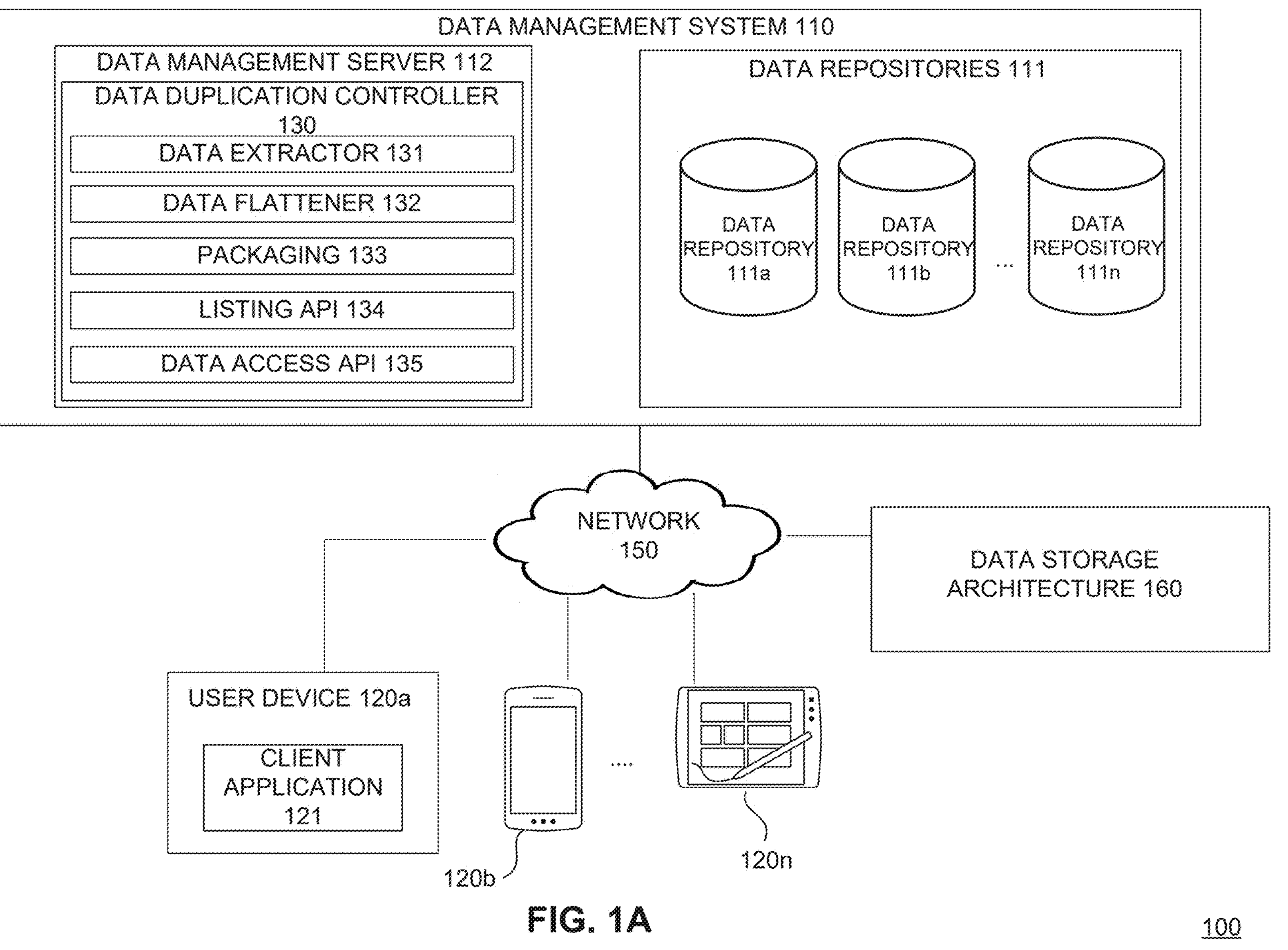
FIG. 1A illustrates an example high level block diagram of a database system architecture wherein the present invention may be implemented.

FIG. 1A illustrates an example high level block diagram of a database management system architecture 100 wherein the present invention may be implemented. As shown, the architecture 100 may include a data management system 110, a plurality of user computing devices 120*a*, 120*b*, . . . 120*n*, and a data storage architecture 160 coupled to each other via a network 150. The data management system 110 may include data repositories 111 and a data management server 112. The data repositories 111 may have two or more data repositories, e.g., 111*a*, 111*b*, . . . and 111*n*. The network 150 may include one or more types of communication networks, e.g., a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 120*a*-120*n* may be any machine or system that is used by a user to access the content management system 110 via the network 150, and may be any commercially available computing devices including laptop computers, desktop computers, mobile phones, smart phones, tablet computers, netbooks, and personal digital assistants (PDAs). A client application 121 may run from a user computing device, e.g., 120*a*, and access data in the database management system 110 via the network 150. User computing devices 120*a*-120*n* are illustrated in more detail in FIG. 4.

The data repositories 111 may store data that client applications (e.g., 121) in user computing devices 120*a*-120*n* may access and may be any commercially available storage devices.

The data management server 112 is typically a remote computer system accessible over a remote or local network, such as the network 150. The data management server 112 could be any commercially available computing devices. A client application (e.g., 121) process may be active on one or more user computing devices 120*a*-120*n*. The corresponding server process may be active on the data management server 112. The client application process and the corresponding server process may communicate with each other over the network 150, thus providing distributed functionality and allowing multiple client applications to take advantage of the information-gathering capabilities of the content management system 110.

The data management system 100 may have a data duplication controller 130 for data duplication management. The data duplication controller 130 may have a data extractor 131 for extracting changes to data stored in the data repositories 111, a data flattener 132 for generating one or more CSV files for the extracted data, a packaging controller 133 for generating a data change file for the CSV files, a listing or catalog API 134 for enabling access to the data change file, and a data access API 135 for accessing to the data change file. Details of the data duplication controller 130 will be described in detail with reference to FIGS. 6 and 7.

The data storage architecture 160 may be, e.g., a data warehouse, and may be operated by a third party.

In one implementation, the data management system 110 may be a multi-tenant system where various elements of hardware and software may be shared by one or more customers. For instance, a server may simultaneously process requests from a plurality of customers, and the data repositories 111 may store data for a plurality of customers. In a multi-tenant system, a user is typically associated with a particular customer. In one example, a user could be an employee of one of a number of pharmaceutical companies which are tenants, or customers, of the data management system 110.

In one embodiment, the data management system 110 may run on a cloud computing platform. Users can access content on the cloud independently by using a virtual machine image, or purchasing access to a service maintained by a cloud database provider.

In one embodiment, the data management system 110 may be provided as Software as a Service ("SaaS") to allow users to access the content management system 110 with a thin client.

Figure 1B:
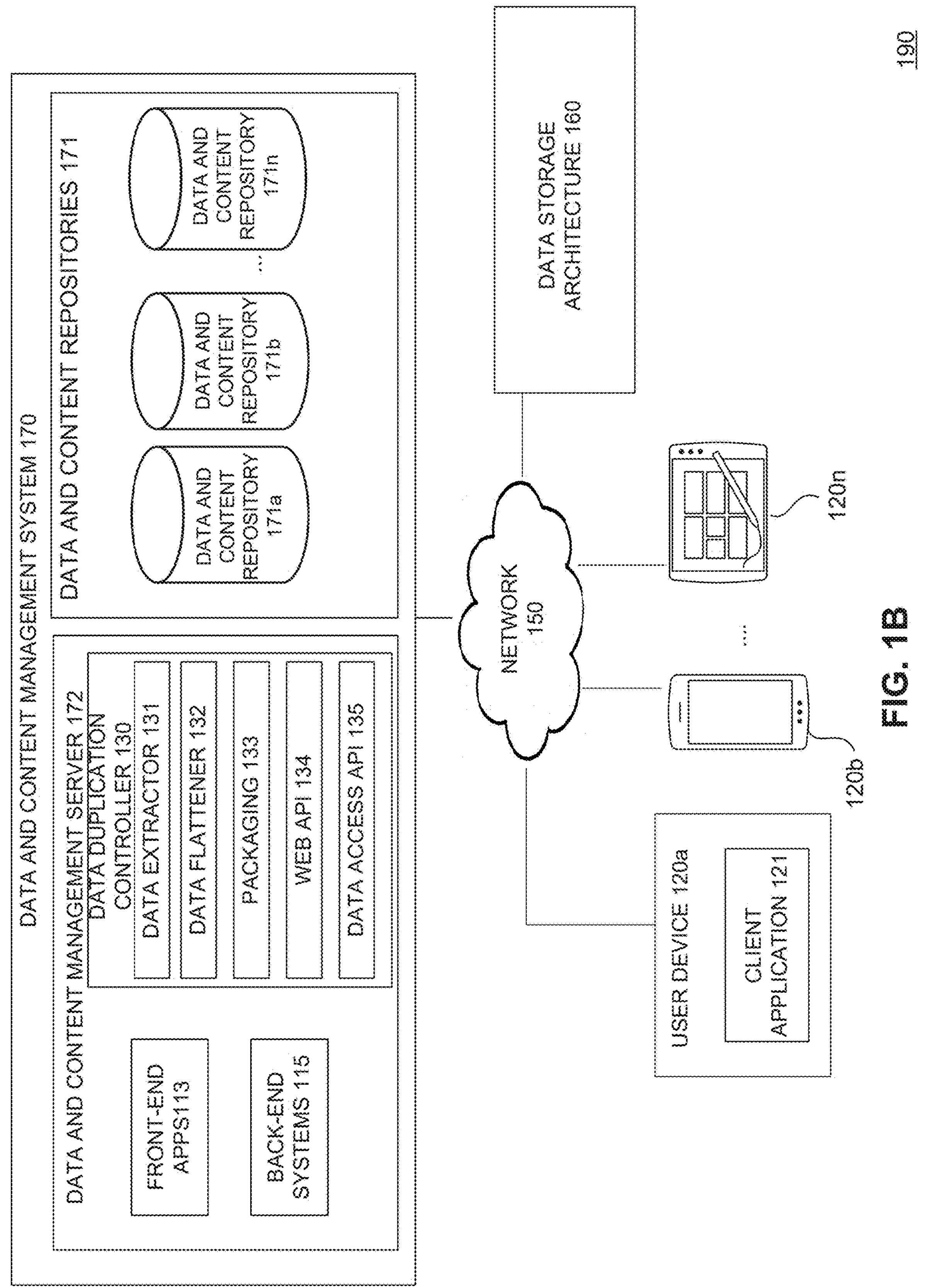
FIG. 1B illustrates an example high level block diagram of an enterprise content management architecture wherein the present invention may be implemented.

FIG. 1B illustrates an example high level block diagram of an enterprise data and content management architecture 190 wherein the present invention may be implemented. The enterprise may be a business, or an organization. As shown, the architecture 190 may include a data and content management system 170, a plurality of user computing devices 120*a*, 120*b*, . . . 120*n*, and a data storage architecture 160 coupled to each other via a network 150. The data and content management system 170 may include a data and content repositories 171 and a data and content management server 172. The data and content repositories 171 may have two or more data and content repositories, e.g., 171*a*, 171*b*, . . . and 171*n*.

The data and content repositories 171 may store data and content that client applications (e.g., 121) in user computing devices 120*a*-120*n* may access and may be any commercially available storage devices. As will be described with reference to FIG. 2 below, each data and content repository (e.g., 171*a*, 171*b* or 171*n*) may store a specific category of content, be the source repository for its content, and allow users to interact with its content in a specific business context.

In one implementation, the data and content repositories 171 may store medical data that client applications (e.g., 121) in user computing devices 120*a*-120*n* may access and may be any commercially available storage devices. Each data and content repository (e.g., 171*a*, 171*b* or 171*n*) may store a specific category of data, and allow users to interact with its data in a specific business context. It should be appreciated that content repositories may be separate logic sections in a same storage device.

The data and content management server 172 is typically a remote computer system accessible over a remote or local network, such as the network 150. The data and content management server 172 could be any commercially available computing devices. A client application (e.g., 121) process may be active on one or more user computing devices 120*a*-120*n*. The corresponding server process may be active on the data and content management server 172, as one of the front-end applications 113 described with reference to FIG. 2. The client application process and the corresponding server process may communicate with each other over the network 150, thus providing distributed functionality and allowing multiple client applications to take advantage of the information-gathering capabilities of the data and content management system 190.

In one implementation, the architecture 190 may be used for aggregating and managing medical data, e.g., clinical trial data. A first repository (e.g., 171*a*) may be used by a first sponsor (e.g., a pharmaceutical company) to store a first study design received from a first computing device (e.g., 120*a*). The first study design may define the infrastructure and lifecycle of the study, and may comprise rules (e.g., for queries, derived values, notifications and displaying events, forms and items), a casebook (i.e., a doctor's binder), event groups, events (e.g., patients visits), forms which comprise segregated sections and fields, item groups and items. In one example, a study design may define a particular study, i.e., each patient may have ten visits, and each visit may have three forms. There may be a workflow associated with each visit, e.g., what needs to be done at each visit.

In one implementation, the first study design may be stored as definition objects in the first repository 171*a*, specifying what is required to happen on each site during the study. The first repository 171*a* may also store electronic records of the first study. In one implementation, the electronic records may be EDC data. Patient clinical trial source data may be captured at the user computing devices, and the aggregated and obfuscated data may be stored as EDC data in the first repository 171*a*.

The second repository 171*b* may be used by a first site (e.g., a hospital) of the first study to store clinical trial source data from a second user computing device (e.g., 120*b*), and a third repository (e.g., 171*c*) may be used by a second site of the first study to store clinical trial source data from a third user computing device (e.g., 120*c*). The clinical trial source data (e.g., three blood pressure values of a patient taken during one visit) in the second repository 171*b* may be converted to EDC data (e.g., the average of the three blood pressure values) automatically, and then stored in the first repository 171*a* as EDC data. Similarly, the clinical trial source data in the third repository 171*c* may be converted to EDC data automatically, and then stored in the first repository 171*a* as EDC data. In one implementation, the clinical trial source data may be converted to the EDC data at the client application 121, and the EDC data is transmitted to the medical data management server 172. In one implementation, the clinical trial source data may be transmitted to the repository 171*b* or 171*c* via the medical data management server 172, and converted to the EDC data at the medical data management server 172. The EDC data is then stored in the repository 171*a*. Data in the second repository 171*b* and the third repository 171*c* may be synchronized with that in the first repository 171*a* regularly or from time to time when new data entries are received from user computing devices. The first study design may be transmitted to the second repository 171*b* and the third repository 171*c*. The second repository and the third repository may be synchronized with the first repository for updates to the first study design.

In another implementation, data management server 172 may control the collection of the medical data, and also the operations and management of the clinical trial, including jobs or assignments to facilitate the real-time visibility and execution of the clinical trial. For instance, the clinical trial source data may be converted to the EDC data at the client application 121, and the EDC data is transmitted to data management server 172. In one implementation, the clinical trial source data may be transmitted to the repository 171*b* or 171*c* via the data management server 172, and converted to the EDC data at the data management server 172. The data management server 172 may receive the EDC data and then manage reimbursements to research sites and tracks the study budgets based on the received EDC data. The data management server 172 may also provide study management and monitoring capabilities. The data management server 172 may generate dashboards and reports tracking key indicators including enrollment and milestones based on the EDC data received from the data management server 172.

In another implementation, a first repository (e.g., 171*a*) may be used by a sponsor (e.g., a pharmaceutical company) using a first computing device (e.g., 120*a*) to store EDC data received from a site (e.g., local lab) using a second computing device (e.g., 120*b*). The EDC data input by the second computing device may contain questionable content requiring verification. Queries may be created by the first computing device and managed by the medical data management server 172. The site (e.g., a local lab) may use the first repository (e.g. 171*a*) from a second user computing device (e.g., 120*b*) to answer the queries managed by the medical data management server 172. Upon satisfactory response, the query can be closed by the medical data management server 172. Alternatively, the first computing device (e.g., 120*a*) may create a subsequent query to be managed by the data management server 172.

The data and content management system 190 may have a data duplication controller 130 for data access management, as will be described in detail with reference to FIGS. 6 and 7.

The data storage architecture 160 may be, e.g., a data warehouse, and may be operated by a third party.

Although the front-end applications 113, back-end systems 115, the data access controller 130 are shown in one server, it should be understood that they may be implemented in multiple computing devices.

In one implementation, the data and content management system 190 may be a multi-tenant system where various elements of hardware and software may be shared by one or more customers. For instance, a server may simultaneously process requests from a plurality of customers, and the data and content repositories 171 may store content for a plurality of customers. In a multi-tenant system, a user is typically associated with a particular customer. In one example, a user could be an employee of one of a number of pharmaceutical companies which are tenants, or customers, of the data and content management system 190.

In one embodiment, the data and content management system 190 may run on a cloud computing platform. Users can access content on the cloud independently by using a virtual machine image, or purchasing access to a service maintained by a cloud database provider.

In one embodiment, the data and content management system 190 may be provided as Software as a Service ("SaaS") to allow users to access the content management system 110 with a thin client.

Figure 2:
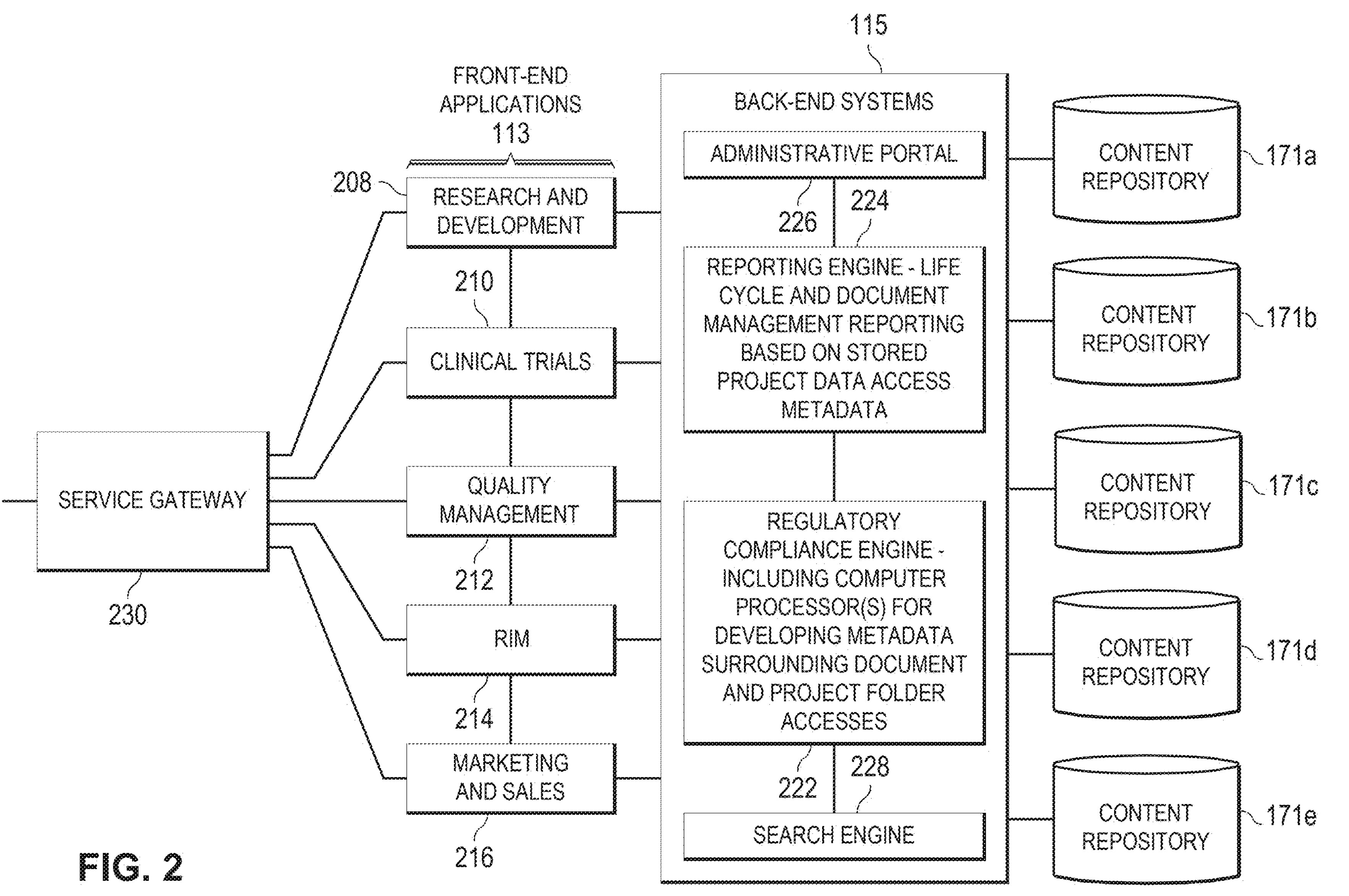
FIG. 2 provides a description of the content management system with additional specific applications and interfaces connected thereto.

FIG. 2 provides a description of the data and content management system 170 with additional specific applications and interfaces connected thereto. In an embodiment, this data and content management system 170 is a cloud-based or distributed network based system for consolidating an enterprise's data, oftentimes integrating multiple content repositories in an enterprise into a single system having coordinated control, measuring, and auditing of data creation, access and distribution.

In an embodiment of the data and content management system 170 for the life sciences industry, as illustrated in the figure, this data and content management system 170 can include specific data collections for the following areas and/or business process-specific front-end applications 113:

A Research & Development (R&D) front-end application 208 provides for an aggregation of materials in support of research and initial clinical trial submissions through building organized and controlled content repositories within the data and content management system 170, more specifically, the content repository 171*a*. Elements that can be stored, organized, and managed through this front-end include submission bills of materials, Drug Information Association (DIA) reference models support, and submission-ready renderings. This front-end 208 is designed to provide an interface to the data and content management system 170 whereby researchers, contract research organizations (CROs), and other collaboration partners can access and/or distribute content through a single controlled document system.

A clinical trials front-end application 210 provides for faster and more organized access to trial documents and reports, while supporting seamless collaboration between sponsors, CROs, sites, investigators and other trial participants. Specific features both ease study and site administration as well as support the DIA trial master file (TMF) reference model. Having this front-end application providing access to the data and content management system 170 further provides for efficient passing off of content, e.g., in the content repository 171*b*, between this phase and other phases of the life sciences development process.

A manufacturing and quality application 212 enables the creation, review, approval and distribution of controlled documents across the organization and with external partners in the context of materials control and other manufacturing elements. The application 212 provides functionality in support of the manufacturing process including watermarking, controlled print, signature manifestation and "Read and Understood" signature capabilities. The documents and metadata associated with this process is managed and stored in the data and content management system 170, or more specifically, the content repository 171*c*, whereby it can be assured that the related documents are not distributed in contravention of law and company policy. The application 212 also manages business processes including change control, complaints, corrective actions and preventive actions ("CAPA"), deviation and audits.

A regulatory information management ("RIM") application 214 provides for management of regulatory information, submission processes and submission reports, which may include, e.g., safety reporting, product registrations, health authority interactions, central and local requirements, submissions to health authorities, and health authority information management. The product registration information may include, e.g., the associated product information, application information, application date, registration details, key registration dates, marketing status, and marketing details. The health authority interactions may include bidirectional interactions with health authorities globally, including correspondences, commitments and queries. Pharmaceutical companies may submit registration applications to health authorities to get approval for selling products in a country. The registration process may take a few months and status of the registration may change over time. User may see global registrations and their status in one or more submission reports. Related documents may be stored in the content repository 171*d*.

A marketing and sales application 216 provides an end-to-end solution for the development, approval, distribution, expiration and withdrawal of promotional materials. Specific features include support for global pieces, approved Form FDA 2253 (or similar international forms) form generation, online document, and video annotation, and a built-in digital asset library (DAL). Again, the communications may be through the data and content management system 170, and the promotional materials may be stored in the content repository 171*e*.

The data and content management system 170 may have a number of back-end system applications 115 that provide for the management of the data, forms, and other communications in. For example, the back-end systems applications 115 may include a regulatory compliance engine 222 to facilitate regulatory compliance, including audit trail systems, electronic signatures systems, and system traceability to comply with government regulations, such as 21 CFR Part 11, Annex 11 and GxP-related requirements. The regulatory compliance engine 222 may include processors for developing metadata surrounding document and project folder accesses so from a regulatory compliance standpoint it can be assured that only allowed accesses have been permitted. The regulatory compliance engine 222 may further includes prevalidation functionality to build controlled content in support of installation qualification (IQ) and/or operational qualification (OQ), resulting in significant savings to customers for their system validation costs.

The back-end systems 115 may contain a reporting engine 224 that reports on documents, their properties and the complete audit trail of changes. These simple-to-navigate reports show end users and management how content moves through its life cycle over time, enabling the ability to track 'plan versus actual' and identify process bottlenecks. The reporting engine may include processors for developing and reporting life cycle and document management reporting based on stored project data and access metadata relative to documents, forms and other communications stored in the data and content management system 170.

The back-end systems 115 can include an administrative portal 226 whereby administrators can control documents, properties, users, security, workflow and reporting with a simple, point-and-click web interface. Customers also have the ability to quickly change and extend the applications or create brand new applications, including without writing additional software code.

The back-end systems 115 may include a search engine 228 whereby the data and content management system 170 can deliver simple, relevant and secure searching.

The data and content management system 170 may have more back-end systems.

In providing this holistic combination of front-end applications 113 and back-end systems 115, the various applications can further be coordinated and communicated with by the service gateway 230, which in turn can provide for communications with various web servers and/or web services APIs. Such web servers and/or web services APIs can include access to the content and metadata layers of some or all of the various front-end applications 113 and back end systems 115, enabling seamless integration among complementary systems.

In the context of the described embodiments, updates in one repository, e.g., the content repository 171*c* for the quality management application front-end application 212, may be shared with a repository (e.g., the RIM repository 171*d*) for another front-end application (e.g., the RIM application 214).

The data and content management system 170 may store content for other industries.

Figure 3:
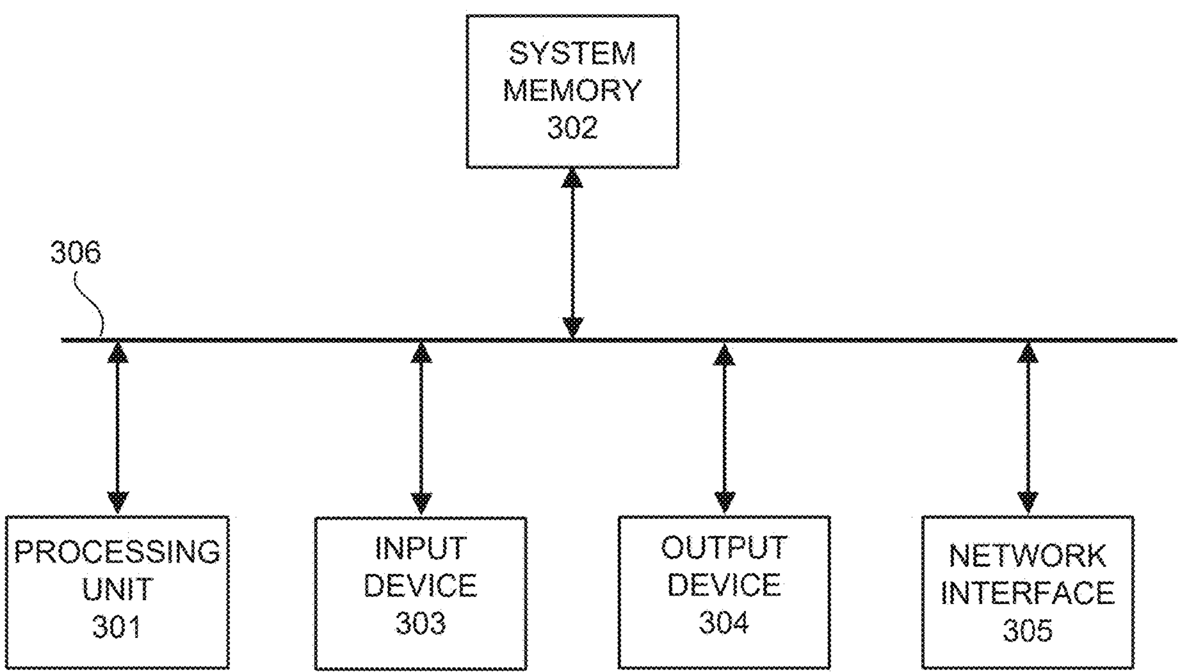
FIG. 3 illustrates an example block diagram of a computing device.

FIG. 3 illustrates an example block diagram of a computing device 300 which can be used as the user computing devices 120*a*-120*n*, and the data management server 112 and data and content management server 172 in FIG. 1. The computing device 300 is only one example of a suitable computing environment and is not intended to suggest any limitation as to scope of use or functionality. The computing device 300 may include a processing unit 301, a system memory 302, an input device 303, an output device 304, a network interface 305 and a system bus 306 that couples these components to each other.

The processing unit 301 may be configured to execute computer instructions that are stored in a computer-readable medium, for example, the system memory 302. The processing unit 301 may be a central processing unit (CPU).

The system memory 302 typically includes a variety of computer readable media which may be any available media accessible by the processing unit 301. For instance, the system memory 302 may include computer storage media in the form of volatile and/or nonvolatile memory such as read only memory (ROM) and/or random access memory (RAM). By way of example, but not limitation, the system memory 302 may store instructions and data, e.g., an operating system, program modules, various application programs, and program data.

A user can enter commands and information to the computing device 300 through the input device 303. The input device 303 may be, e.g., a keyboard, a touchscreen input device, a touch pad, a mouse, a microphone, and/or a pen.

The computing device 300 may provide its output via the output device 304 which may be, e.g., a monitor or other type of display device, a speaker, or a printer.

The computing device 300, through the network interface 305, may operate in a networked or distributed environment using logical connections to one or more other computing devices, which may be a personal computer, a server, a router, a network PC, a peer device, a smart phone, or any other media consumption or transmission device, and may include any or all of the elements described above. The logical connections may include a network (e.g., the network 150) and/or buses. The network interface 305 may be configured to allow the computing device 300 to transmit and receive data in a network, for example, the network 150. The network interface 305 may include one or more network interface cards (NICs).

Figure 4:
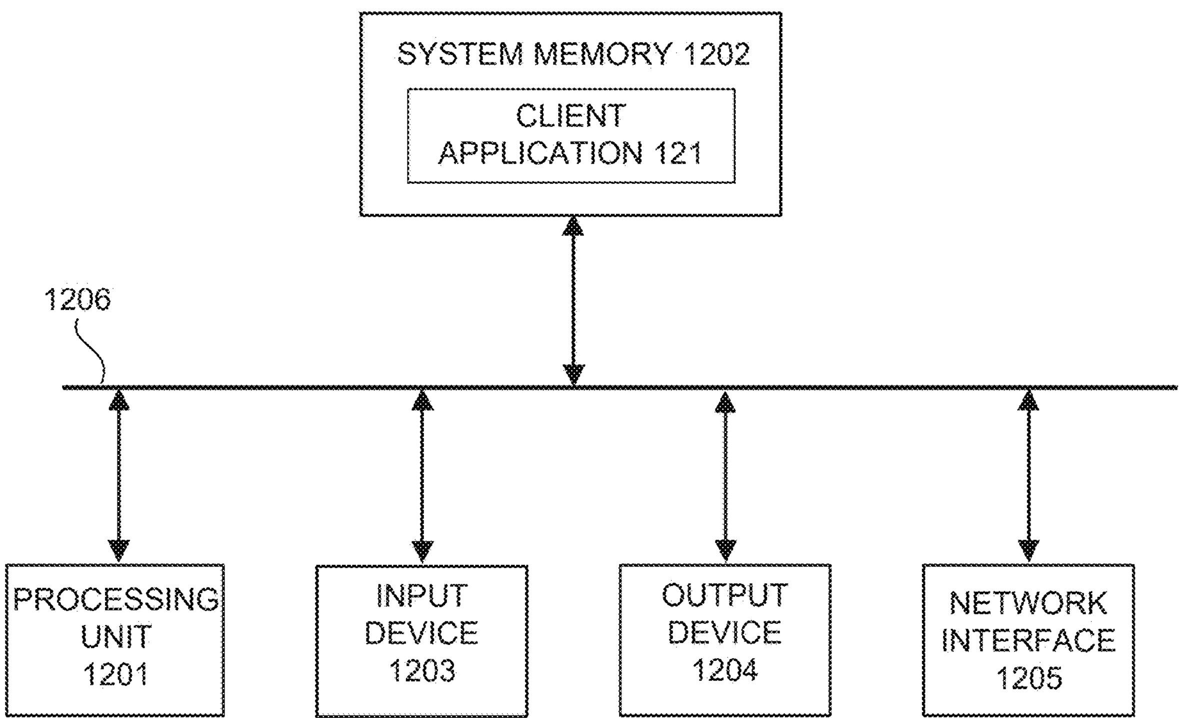
FIG. 4 illustrates an example high level block diagram of a user computing device.

FIG. 4 illustrates an example high level block diagram of a user computing device (e.g., 120*a*) wherein the present invention may be implemented. The user computing device 120*a* may be implemented by the computing device 300 described above, and may have a processing unit 1201, a system memory 1202, an input device 1203, an output device 1204, and a network interface 1205, coupled to each other via a system bus 1206. The system memory 1202 may store the client application 121.

Figure 5:
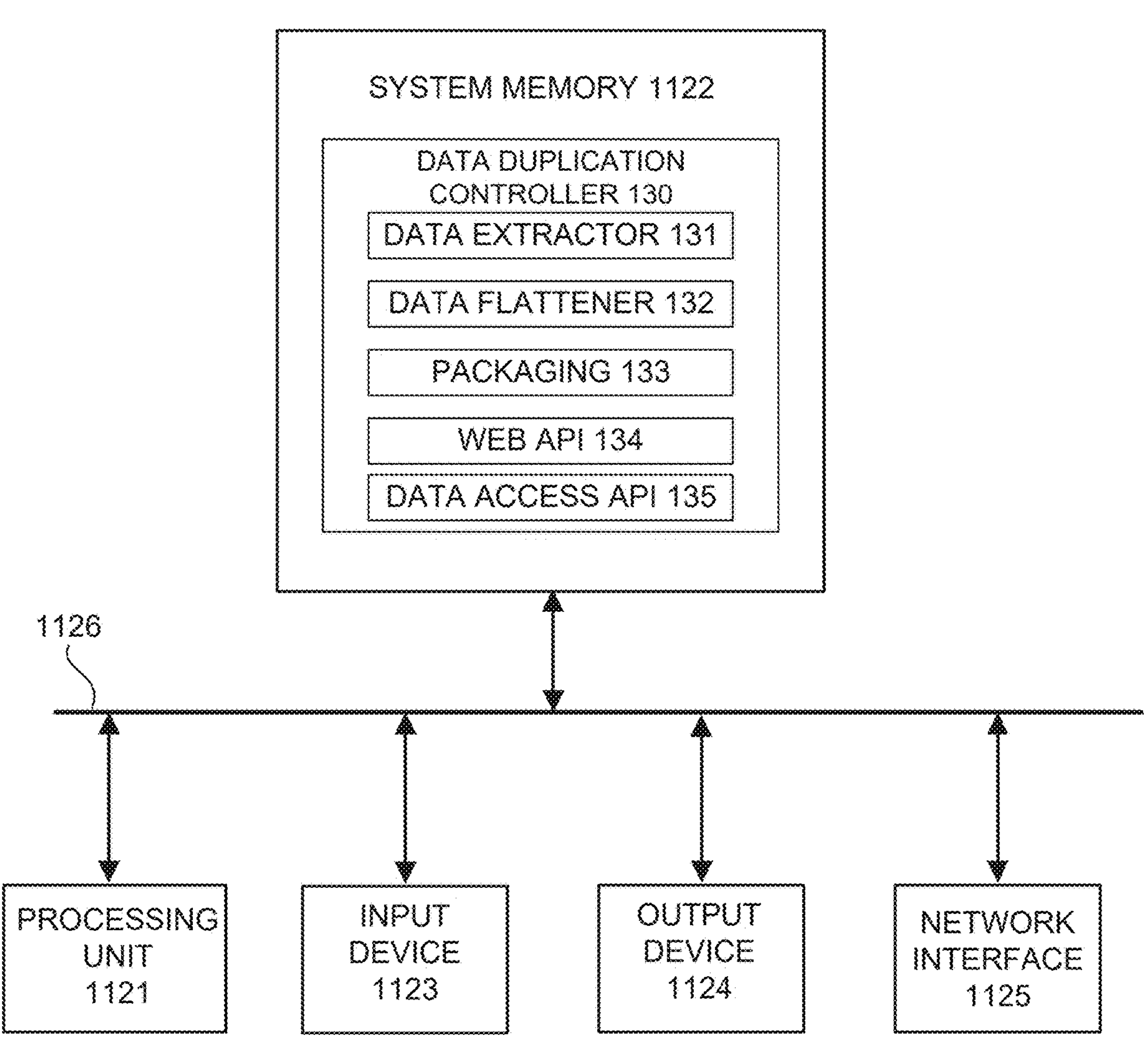
FIG. 5 illustrates an example high level block diagram of the data management server according to one embodiment of the present invention.

FIG. 5 illustrates an example high level block diagram of the data management server 112 according to one embodiment of the present invention. The data management server 112 may be implemented by the computing device 300, and may have a processing unit 1121, a system memory 1122, an input device 1123, an output device 1124, and a network interface 1125, coupled to each other via a system bus 1126. The system memory 1122 may store the data access controller 130.

The present invention provides a new class of API that enables high speed data access to applications in the data management system (e.g., 110) and high-speed data duplication from the data management system (e.g., 110) to a data storage architecture (e.g., 160).

In one embodiment, data in the data management system is made available at a predetermined schedule as a full copy (e.g., daily), with incremental change files (e.g., every 15 minutes).

In one embodiment, the full scope of data is made available.

In one embodiment, an incremental file is based on a previous incremental file or a previous full file.

In one embodiment, the files can be platform files which are standard on objects (one per object) and documents (one file for all document types).

In one embodiment, the data duplication controller 130 may run as a system with a specific permission, so the full data is available without regard to row, field or document security.

In one embodiment, the format of the files is fully described using metadata and is itself an API. Any changes will be upward compatible.

The approach of duplicating data of the present invention can achieve high performance and consistency, and short latency. In one embodiment, the latency is not more than 15 minutes. For example, a file produced at 6:00 is consistent, and includes all data as of at least 5:45. In one implementation, 5:45 is the snapshot datetime that indicates when the database was queried so as to record the state of the data. The snapshot datetime locks down the state of the database and ensures there is no overlap with the next incremental snapshot. 6:00 may correspond to a published datetime.

Figure 6:
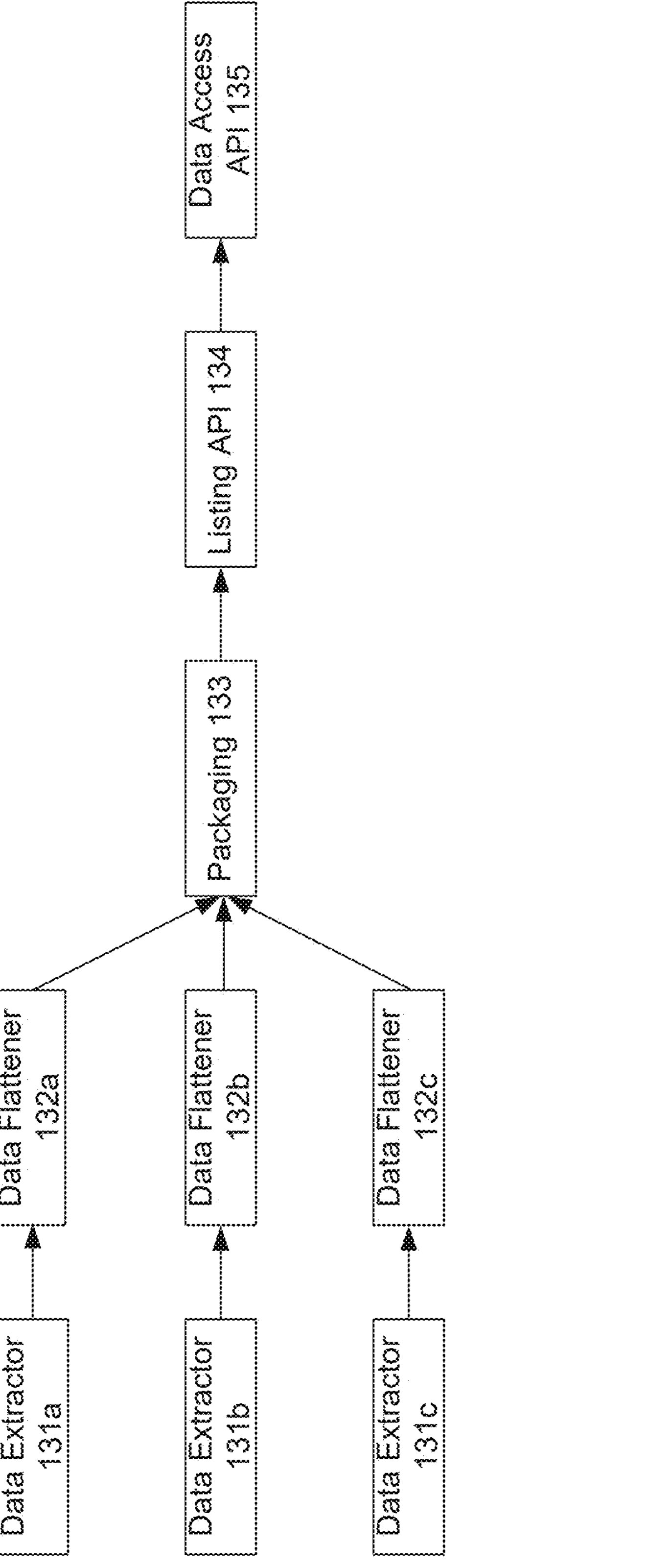
FIG. 6 illustrates a block diagram of the data duplication controller for managing data duplication in the database system 100 (as shown in FIG. 1A) or the content management system 190 (as shown in FIG. 1B) according to one embodiment of the present invention.

As shown in FIG. 6, the data duplication controller 130 may have a number of data extractors 131*a*, 131*b*, and 131*c*, a number of data flatteners 132*a*, 132*b*, and 132*c*, a data packaging controller 133, and a listing or catalog API 134.

In one embodiment, the data flattener 132 is responsible for querying data, transforming, and writing to a flat file, which could be a CSV, JSON, XML, or Parquet file. The data flatteners may pull for changes and append them to an archive file, e.g., a zip file, and could be standard platform flatteners and app specific flatteners. In one embodiment, the data flattener may create two files: one is for tracking incremental changes (e.g., every 15 minutes), and the other one is for maintaining a full replica of the data in CSV files. The data flattener 132 may concatenate the data and deduplicate the data.

In one embodiment, system flatteners may be used for, e.g., data objects, audit trails, and doctypes, and may produce flat files for each data object, doctype, and audit log. The data flattener transforms multi-dimensional structures (e.g., objects) into a single one-dimensional representation where each piece of data is presented in a flat form.

In one embodiment, a Data Extraction service may be performed by the flatteners to orchestrate the data extracted from tables in the data management system into flat files. The flatteners may extract, transform, and write flat files for a specific extract.

An Extract is a named entity that can be pulled from the data management system. Each extract may be manifested as a CSV file. In one embodiment, extracts are defined in the data management system metadata as Directdataextract components in order to inform the extraction service and a describe API. A subcomponent Extractcolumn defines each column in the CSV file.

Extracts may be added when appropriate to extend the set of data available to the duplication management of the present invention. For example, when a customer creates a custom object, it may be added as an Extract.

Extract CSV may follow standard conventions for format. In one embodiment, they may include:

Name—the file name of a Directdatafile is vaultid-direct-datafile.name-{fulllinc}.csv Header Row—the first row of the csv provides field names. For system flatteners, the field names will be the same as configured in the data management system.

ID—the first column of the file has a row identifier (id). This will be the ID of the record in data management system.

Relationships—a relationship column will reference the ID of the related record. The user will use the metadata API to identify the referenced datafile.

Standard Columns modified_date_v modified_by_v file—pointer to content source.

In one embodiment, the packaging controller 133 is a publisher. The publisher may read the flattened data from the data flatteners 132, package the flat files into a data change file, and publish the data change file to the listing API 134. The publisher could be standard platform publishers and app specific publishers. In one embodiment, the publishers may run on a predetermined schedule (e.g., every 15 minutes), pull from flat files and publish Extracts based on a consistent timestamp so that they are available to the listing API 134.

The data change file may be, e.g., a zip file, and may provide a complete and consistent set of Extract files for a given data repository. The set makes it easy for the user to understand which resource to pull from the data repository, rather than having several thousand individual extract files.

The zip files are available via the data access API 135.

A REST API may be used by tool and integration developers to interact with the zip file. Using the REST API, users can discover, describe, and download data updates. The payload of a dataset is designed to be easily consumed into a data warehouse or data lake.

Figure 7:
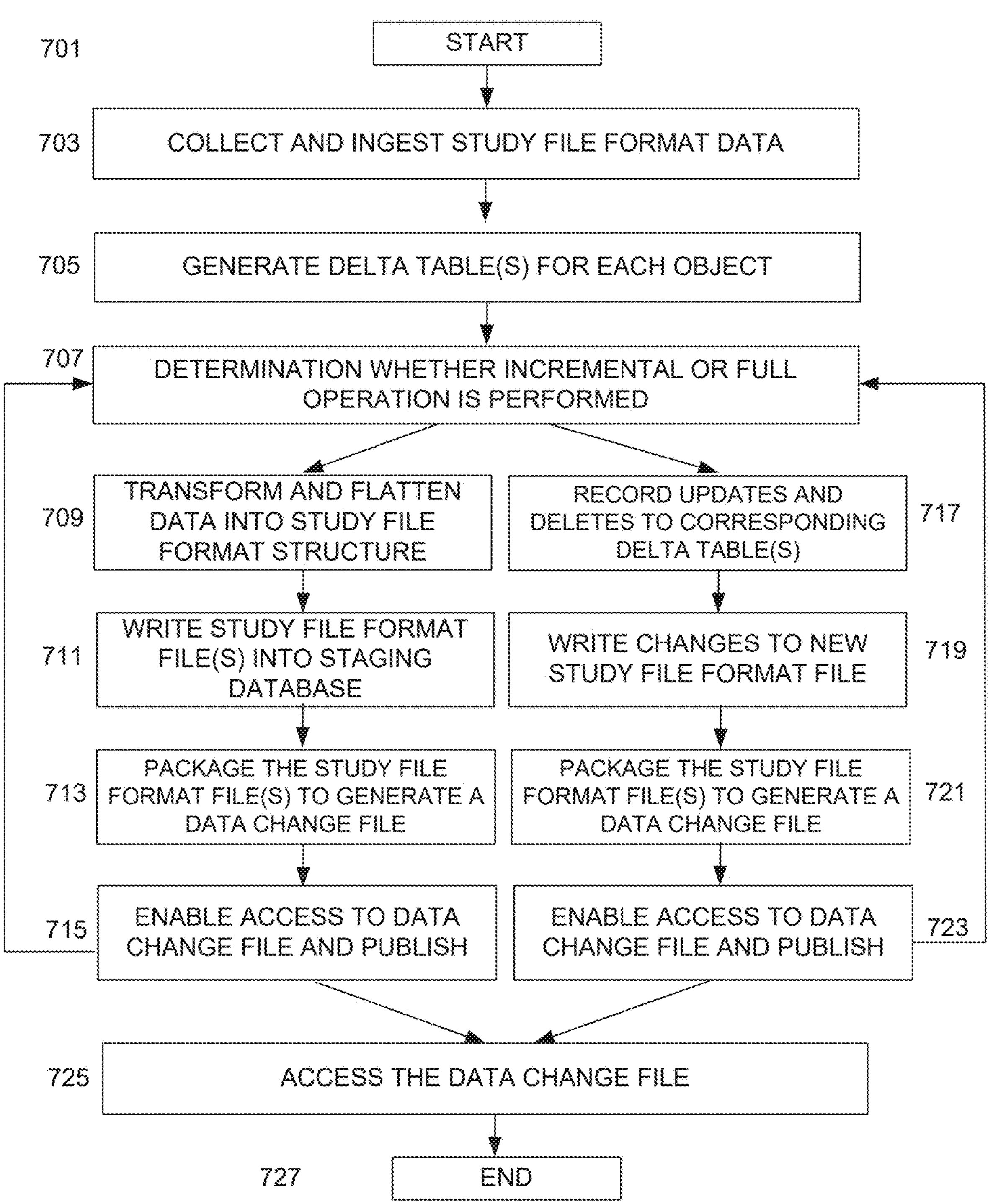
FIG. 7 illustrates a flowchart of a method for managing data duplication in the database system 100 (as shown in FIG. 1A) or the content management system 190 (as shown in FIG. 1B) according to one embodiment of the present invention.

FIG. 7 illustrates a flowchart of a method for duplicating data in the data management system 100 (as shown in FIG. 1A) or data and content management system 190 (as shown in FIG. 1B) according to one embodiment of the present invention. The process may start at 701.

At 703, data is collected and ingested into the data management system 100 (as shown in FIG. 1A), or data and content management system 190 (as shown in FIG. 1B) according to one embodiment of the present invention. In one implementation, the data and content management system 190 may support the duplication of study file format data comprising clinical study data and clinical study definition data. The study data may include clinical data, operational data and reference data. The clinical data may include raw data entered for each subject across all clinical sites within the clinical study. The operational data may include data that tracks the progress of subjects, data cleaning, and data review within the clinical data management system. The reference data may include ancillary data that can be used in tandem with clinical data to serve as lookup fields. A CSV file may be ingested for each clinical data file, operational data file, and reference data file. The clinical study definition data may include the study definition information and the definition of each file in the study data portion, as well as a full capture of study design data for the latest casebook version. The study definition may be represented as a JSON file.

In one implementation, ingestion comprises extracting data. An extract is a configuration used to extract an object. In one embodiment, an extract may be defined for each object/table and a number of extracts may be defined. For example, a subject object may be defined as an extract, and a country object may be defined as another extract.

At 705, delta tables are generated for each object in the study file format data to be duplicated. As data is being updated in the system 100 or 190, a copy of the updated data is being written to a delta table for collecting all the changes. In one embodiment, when a record is added, updated, or deleted in an application, a corresponding record is written to a log object/table to log in the changes. The delta table entries may include columns of relevant associated fields for the modified object as well as a delta indicator specifying whether the record is added, updated, or deleted.

In one embodiment, the delta table may capture and temporarily log data changes and be cleaned after a predetermined period of time, e.g., 3 days.

At 707, determination is made whether an incremental or full operation is performed. When a full update is performed, the process proceeds to step 709. When an incremental update is performed, the process proceeds to step 719. Before any incremental operations are performed, the latest available full operation is required. Similarly, when a study design change occurs, the incremental operations are paused until the next full operation is performed. For example, when a modification is made to the clinical study definition data in response to a change in the study design, the incremental operations are paused until the next full operation is performed.

At 709, the ingested data is transformed and flattened into a study file format structure. In one implementation, the structure may be one or more CSV files. A data flattener (e.g., 132) may run at a predetermined time interval, e.g., every 15 minutes, and produce a CSV file at 709 for the changes within the predetermined time interval to get the updated data out. The data flattener may flatten the data and turn the data into the CSV format.

In one embodiment, a CSV file may be produced for each delta table, or log object. For an extract, there may be one or more CSV files to store updates. In one embodiment, creates or updates may be stored in one file, and deletes may be stored in a separate file, so there may be two CSV files for one extract.

Each CSV file has a start time and a stop time. The CSV file may include all object rows and deletes that have been modified on or after the start time and on or before the stop time. In one embodiment, the time stamp is the time of writing, not the time of commit.

The CSV files can be full or incremental. In one embodiment, a full file is produced every day with a stop time of 00:00 of the next day. An incremental is produced with stop times in 15 minute intervals. For example, the first incremental stop time in a day is 00:15 with a start time of 00:00 the day before. That last incremental has a start time of 23:45 and a stop time of 00:00 on the next day. In one embodiment, incremental and full files are produced as soon as possible after the stop time but never later than 15 minutes after the stop time. In one embodiment, all times for the present invention are GMT.

At 711, the CSV files generated at 709 are written into a staging database. In one implementation, the staging database may be the data storage architecture 160.

At 713, a data change file may be generated by a packaging controller (e.g., 133) to package all the CSV files for all the extracts. In one embodiment, the data change file is a zip file.

At 715, the data change file may be made available for access. In one embodiment, a listing API (e.g., 134) may list the data change files that are available. The data change file may be accessed, e.g., downloaded via a data access API (e.g., 135). After completion, the process returns to step 707 to determine whether another incremental or full operation is required. Otherwise, the process proceeds to 725.

The process proceeds to step 717 when an incremental operation is performed.

At 717, updates and deletes are recorded to corresponding delta table(s) generated in 705. As data is being updated in the system 100 or 190, a copy of the updated data is being written to a delta table for collecting all the changes. In one embodiment, when a record is added, updated, or deleted in an application, a corresponding record is written to a log object/table to log in the changes. The delta table entries may include columns of relevant associated fields for the modified object as well as a delta indicator specifying whether the record is added, updated, or deleted.

At 719, changes are written to a new study file format file. In one implementation, a data flattener (e.g., 132) may run at a predetermined time interval, e.g., every 15 minutes, and produce a CSV file at 719 for the changes within the predetermined time interval to get the updated data out. The data flattener may flatten the data and turn the data into the CSV format.

In one embodiment, a CSV file may be produced for each delta table, or log object. For an extract, there may be one or more CSV files to store updates. In one embodiment, creates or updates may be stored in one file, and deletes may be stored in a separate file, so there may be two CSV files for one extract.

At 721, a data change file may be generated by a packaging controller (e.g., 133) to package all the CSV files for all the extracts. In one embodiment, the data change file is a zip file.

At 723, the data change file may be made available for access. In one embodiment, a listing API (e.g., 134) may list the data change files that are available. The data change file may be accessed, e.g., downloaded via a data access API (e.g., 135). After completion, the process returns to step 707 to determine whether another incremental or full operation is required. Otherwise, the process proceeds to 725.

At 725, available incremental and full packages are retrieved using the data access API 135.

The process ends at 727.

While various embodiments have been described above, it should be understood that they have been presented by way of example only, and not limitation. Thus, the breadth and scope of a preferred embodiment should not be limited by any of the above described exemplary embodiments, but should be defined only in accordance with the claims and their equivalents for any patent that issues claiming priority from the present provisional patent application.

In all descriptions of "servers" or other computing devices herein, whether or not the illustrations of those servers or other computing devices similarly show a server-like illustration in the figures, it should be understood that any such described servers or computing devices will similarly per form their described functions in accordance with computer readable instructions stored on a computer-readable media that are connected thereto.

Resources may encompass any types of resources for running instances including hardware (such as servers, clients, mainframe computers, networks, network storage, data sources, memory, central processing unit time, Scientific instruments, and other computing devices), as well as software, software licenses, available network services, and other non-hardware resources, or a combination thereof.

A networked computing environment may include, but is not limited to, computing grid systems, distributed computing environments, cloud computing environment, etc. Such networked computing environments include hardware and Software infrastructures configured to form a virtual organization comprised of multiple resources which may be in geographically disperse locations.

Various terms used herein have special meanings within the present technical field. Whether a particular term should be construed as such a "term of art, depends on the context in which that term is used. "Connected to," "in communication with or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time." "equivalent," "during," "complete," and the like should be understood to mean "substantially at the time." "substantially equivalent," "substantially during," "substantially complete," etc., where "substantially" means that such comparisons, measurements, and timings are practicable to accomplish the implicitly or expressly stated desired result.

The steps and/or operations described above in relation to an embodiment of the present disclosure may occur in a different order, or in parallel, or concurrently for different epochs, etc. depending on the specific embodiment and/or implementation, as would be understood by one of ordinary skill in the art. Different embodiments may perform actions in a different order or by different ways or means. As would be understood by one of ordinary skill in the art, some drawings are simplified representations of the actions performed, their descriptions herein simplified overviews, and real-world implementations would be much more complex, require more stages and/or components, and would also vary depending on the requirements of the particular implementation. Being simplified representations, these drawings do not show other required steps as these may be known and understood by one of ordinary skill in the art and may not be pertinent and/or helpful to the present description.

Similarly, some drawings are simplified block diagrams showing only pertinent components, and some of these components merely represent a function and/or operation well-known in the field, rather than an actual piece of hardware, as would be understood by one of ordinary skill in the art. In such cases, some or all of the components/ modules may be implemented or provided in a variety and/or combinations of manners, such as at least partially firmware and/or hardware, including, but not limited to one or more application-specific integrated circuits ("ASICS"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques.

One or more processors, simple micro controllers, controllers, and the like, whether alone or in a multi-processing arrangement, may be employed to execute sequences of instructions stored on non-transitory computer-readable media to implement embodiments of the present disclosure. In some embodiments, hard-wired circuitry may be used in place of or in combination with software instructions. Thus, embodiments of the present disclosure are not limited to any specific combination of hardware circuitry, firmware, and/or software.

The term "computer-readable medium" as used herein refers to any medium that stores instructions which may be provided to a processor for execution. Such a medium may take many forms, including but not limited to, non-volatile and volatile media. Common forms of non-transitory computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium on which instructions which can be executed by a processor are stored.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field, such claims should not be limited by the language chosen under this heading to describe the so-called technical field. Further, a description of a technology in the "Background is not to be construed as an admission that technology is prior art to any invention(s) in this disclosure. Neither is the "Brief Summary" to be considered as a characterization of the invention(s) set forth in issued claims. Furthermore, any reference in this disclosure to "invention' in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

The invention claimed is:

1. A computer-implemented method for improved data duplication from a data management system, wherein the data management system comprises at least one data repository and a data duplication controller, the computer-implemented method comprising:

ingesting study file format data into the data management system, the study file format data comprising clinical study data and clinical study definition data;

generating a delta table for each object in the study file format data, wherein as data is updated in the data management system, a copy of the updated data is written to the delta table for collecting data changes;

determining whether a full operations or an incremental operation is to be performed;

extracting each data change by a data extractor in the data duplication controller;

running a data flattener in the data duplication controller to generate flattened data for each data change, and creating a first flat file for the flattened data for a first extracted data change and a second flat file for the flattened data for a second extracted data change, wherein the first flat file includes data of the first object but not the second object, and the second flat file includes data of the second object but not the first object, and wherein the first extract is configured to extract a first object in the data management system and the second extract is configured to extract a second object in the data management system;

generating a data change file to package the first flat file and the second flat file for the flattened data for the extracted data changes by a packaging controller in the data duplication controller; and presenting the data change file with a listing API in the data duplication controller to enable access to the data change file.

2. The method of claim 1, wherein the first predetermined time interval is 15 minutes.

3. The method of claim 1, further comprising: running the data flattener at a second predetermined time interval to extract the data changes within the second predetermined time interval and generating a first incremental change flat file.

4. The method of claim 3, wherein the second predetermined time interval is 15 minutes.

5. The method of claim 1, further comprising: maintaining a full copy of the flattened data.

6. The method of claim 1, wherein the flat file is a CSV file, a JSON file, an XML file, or a Parquet file.

7. The method of claim 1, wherein the generating flattened data for the extracted data changes further comprises concatenating the data by the data flattener.

8. The method of claim 1, wherein the generating flattened data for the extracted data changes further comprises deduplicating the data by the data flattener.

9. The method of claim 1, wherein the data is duplicated from the data management system to a data storage system.

10. The method of claim 9, wherein the data storage system is a data warehouse.

11. The method of claim 1, wherein the first data change file is a zip file.

12. The method of claim 1, wherein the first data change file is accessed by a data access API.

13. The method of claim 12, wherein the data access API is an REST API.

14. The method of claim 1, further comprising: cleaning the delta table at a third predetermined time interval.

15. The method of claim 14, wherein the third predetermined time interval is 3 days.

16. The method of claim 1, further comprising: creating a flat file for each delta table.

17. The method of claim 1, further comprising: storing data updates in a third flat file.

18. The method of claim 17, further comprising: storing data deletes in a fourth flat file.

19. The method of claim 1, wherein the first flat file has a first start time and a first stop time, and the first flat file comprises data changes on or after the first start time and on or before the first stop time.

20. The method of claim 1, wherein the first repository is a data repository.

21. The method of claim 1, wherein the first repository is a data and content repository.

22. A data management system, comprising a processor, a memory, at least one repository and a data duplication controller, wherein the data duplication controller comprises:

a data extractor for extracting a data change in the data management system, wherein the data change modifies an object in the at least one data repository and records the data change to a delta table for collecting the data changes in the data management system, wherein the delta table comprises associated fields corresponding to the object, and a delta indicator specifying whether the data change is an addition, update, or deletion;

a data flattener for generating flattened data for the extracted data changes, and creating a first flat file and a second flat file for the flattened data for the extracted data changes, wherein the first flat file includes data of the first object but not the second object, and the second flat file includes data of the second object but not the first object, wherein the first flat file is for a first extract and the second flat file is for a second extract, and wherein the first extract is configured to extract a first object in the data management system and the second extract is configured to extract a second object in the data management system;

a packaging controller for receiving the first and second flat files from the data flattener at a first predetermined time interval, and creating a first data change file to package the first flat file and the second flat file for the flattened data for the extracted data changes; and a listing API for presenting the first data change file to enable access to the data change file.

* * * * *